US006950864B1

(12) United States Patent
Tsuchiya

(10) Patent No.: US 6,950,864 B1
(45) Date of Patent: Sep. 27, 2005

(54) MANAGEMENT OBJECT PROCESS UNIT

(75) Inventor: Hiroteru Tsuchiya, Numazu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 561 days.

(21) Appl. No.: 09/626,820

(22) Filed: Jul. 27, 2000

(30) Foreign Application Priority Data

Jul. 28, 1999 (JP) ................................ 11-213896

(51) Int. Cl.[7] ........................ G06F 15/173; G06F 15/16

(52) U.S. Cl. ...................... 709/223; 709/201; 709/226; 709/230

(58) Field of Search ................................ 370/408, 902; 709/223, 201, 226, 230

(56) References Cited

U.S. PATENT DOCUMENTS

| | | | | |
|---|---|---|---|---|
| 5,651,006 A | * | 7/1997 | Fujino et al. ................ | 370/408 |
| 5,787,252 A | * | 7/1998 | Schettler et al. ............. | 709/224 |
| 5,822,535 A | * | 10/1998 | Takase et al. ................ | 709/226 |
| 5,845,080 A | * | 12/1998 | Hamada et al. .............. | 709/224 |

FOREIGN PATENT DOCUMENTS

JP          9-259062        10/1997

* cited by examiner

Primary Examiner—David Wiley
Assistant Examiner—Arrienne M. Lezak
(74) Attorney, Agent, or Firm—Frishauf, Holtz, Goodman & Chick, P.C.

(57) ABSTRACT

An agent includes a control processing section for performing a control of selectively collecting a plurality of management objects from a managed device, and a memory section for storing the management objects collected from the managed device. Particularly, the control processing section includes an object managing section, having a plurality of classification data items for classifying the plurality of management objects respectively, for collecting those of the management objects in advance which are classified to a specific type by the classification data to store the collected management objects in the memory section, for checking, at a time of receiving an object collection request, the classification data item for a management object requested by the object collection request, for retrieving the management object confirmed by a check result as being of the specific type from the memory section to transmit the retrieved management object, and for collecting the management object confirmed by the check result as being of a type other than the specific type from the managed device to transmit the collected management object.

6 Claims, 9 Drawing Sheets

|  20a  |  20b  |  20c 20 |  20d  |
|---|---|---|---|
| MANAGEMENT OBJECT IDENTIFIER | MANAGEMENT OBJECT COLLECTION TIME | MANAGEMENT OBJECT | CLASSIFICATION DATA |
| ××·××·×× | ×× m sec | 50 | TYPE B |
| ------ | ------ | ------ | ------ |
| ------ | ------ | ------ | ------ |

FIG. 5

| LONG COLLECTION TIME | CLASSIFICATION DATA |
|---|---|
| ○ (=YES) | TYPE A |
| × (=NO) | TYPE B |

FIG. 6

| TYPE A | SEND COLLECTION REQUEST FOR MANAGEMENT OBJECT OF RECEIVED IDENTIFIER TO MIB PROCESSING SECTION. |
|---|---|
| TYPE B | SEND COLLECTION REQUEST TO MIB PROCESSING SECTION TO PREVIOUSLY STORE COLLECTED MANAGEMENT OBJECTS IN MANAGEMENT TABLE. READ MANAGEMENT OBJECT OF RECEIVED IDENTIFIER FROM MANAGEMENT TABLE TO PRODUCE RESPONSE. |

FIG. 7

| 20a | 20e | | | 20c | 20d |
|---|---|---|---|---|---|
| MANAGEMENT OBJECT IDENTIFIER | DATA VALUE (1) | ---- | DATA VALUE (n) | MANAGEMENT OBJECT | CLASSIFICATION DATA |
| | | | | | |
| | | | | | |
| | | | | | |

FIG. 9

| 20a | 20c | 20f | | | 20d |
|---|---|---|---|---|---|
| MANAGEMENT OBJECT IDENTIFIER | MANAGEMENT OBJECT | NUMBER OF ACCESSES IN TIME (1) | ---- | NUMBER OF ACCESSES IN TIME (n) | CLASSIFICATION DATA |
| | | | | | |
| | | | | | |
| | | | | | |

FIG. 10

| TYPE A | SEND COLLECTION REQUEST FOR MANAGEMENT OBJECTS OF TYPE B TO MIB PROCESSING SECTION TO STORE COLLECTED MANAGEMENT OBJECTS IN MANAGEMENT TABLE. THEREAFTER, SEND COLLECTION REQUEST FOR MANAGEMENT OBJECT OF RECEIVED IDENTIFIER TO MIB PROCESSING SECTION. |
|---|---|
| TYPE B | READ MANAGEMENT OBJECT OF RECEIVED IDENTIFIER FROM MANAGEMENT TABLE. IF IT IS ABSENT, SEND COLLECTION REQUEST FOR MANAGEMENT OBJECT OF RECEIVED IDENTIFIER TO MIB PROCESSING SECTION. |

FIG. 11

| 20a | 20b | 20c | 20f { 20 | | 20d |
|---|---|---|---|---|---|
| MANAGEMENT OBJECT IDENTIFIER | MANAGEMENT OBJECT COLLECTION TIME | MANAGEMENT OBJECT | NUMBER OF ACCESSES IN TIME (1) | --- NUMBER OF ACCESSES IN TIME (n) | CLASSIFI-CATION DATA |
| | | | | | |
| | | | | | |
| | | | | | |

FIG. 13

| LONG COLLECTION TIME | HIGH ACCESS FREQUENCY | CLASSIFICATION DATA |
|---|---|---|
| ○ | ○ | TYPE A |
| ○ | × | TYPE A |
| × | ○ | TYPE B |
| × | × | TYPE C |

○=YES  ×=NO

FIG. 14

| TYPE A | SEND COLLECTION REQUEST FOR MANAGEMENT OBJECTS OF TYPE B TO MIB PROCESSING SECTION AND STORE MANAGEMENT OBJECTS IN MANAGEMENT TABLE. THEREAFTER, SEND COLLECTION REQUEST FOR MANAGEMENT OBJECT OF RECEIVED IDENTIFIER TO MIB PROCESSING SECTION. |
|---|---|
| TYPE B | READ MANAGEMENT OBJECT OF RECEIVED IDENTIFIER FROM MANAGEMENT TABLE. IF IT IS ABSENT, SEND COLLECTION REQUEST FOR MANAGEMENT OBJECT OF RECEIVED IDENTIFIER TO MIB PROCESSING SECTION. |
| TYPE C | SEND COLLECTION REQUEST FOR MANAGEMENT OBJECT OF RECEIVED IDENTIFIER TO MIB PROCESSING SECTION. |

FIG. 15

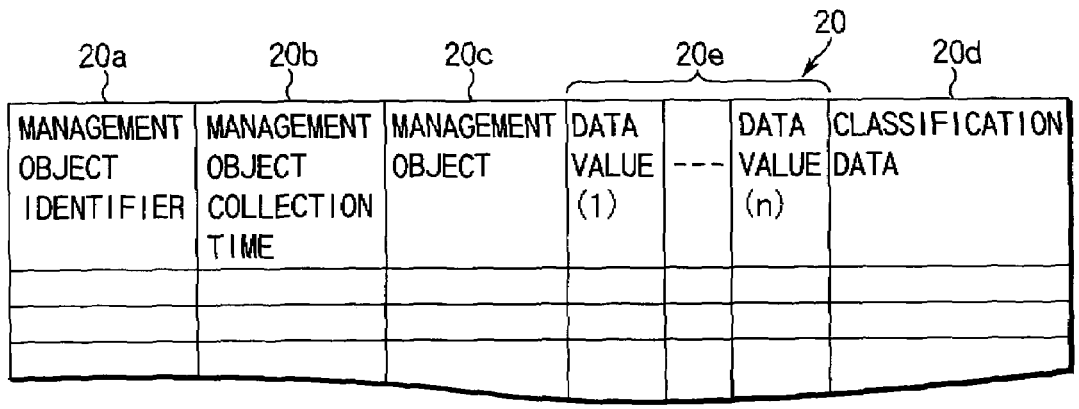
FIG. 17
| LONG COLLECTION TIME | HIGH VALUE CHANGE FREQUENCY | CLASSIFICATION DATA |
|---|---|---|
| ○ | ○ | TYPE A |
| ○ | × | TYPE A |
| × | ○ | TYPE B |
| × | × | TYPE C |
○=YES ×=NO
FIG. 18
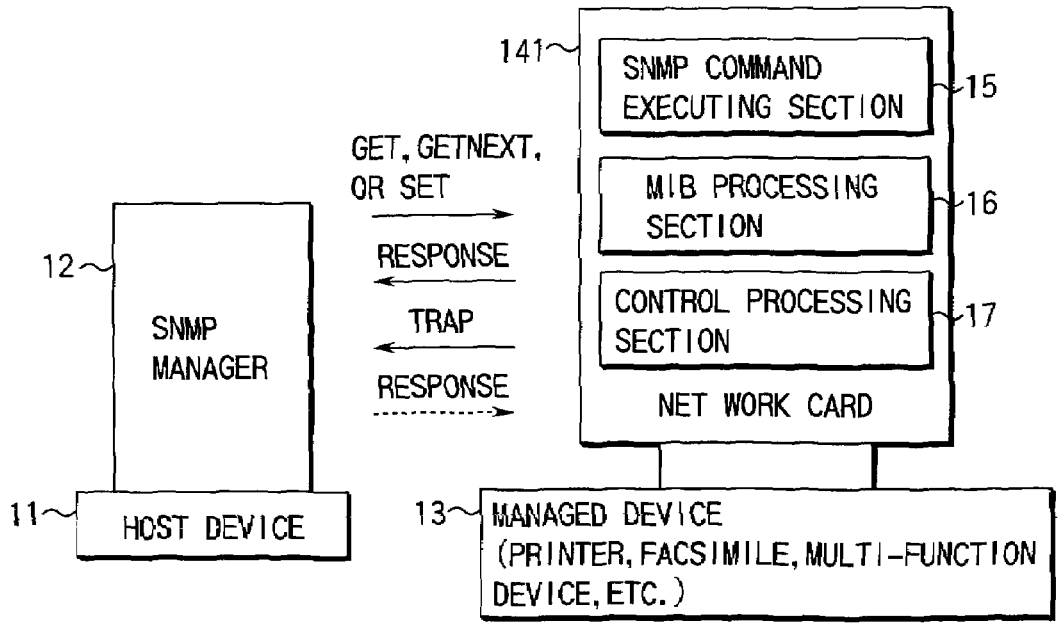
FIG. 19

MANAGEMENT OBJECT PROCESS UNIT

CROSS-REFERENCE TO RELATED APPLICATIONS

This application is based upon and claims the benefit of priority from the prior Japanese Patent Application No. 11-213896, filed Jul. 28, 1999, the entire contents of which are incorporated herein by reference.

BACKGROUND OF THE INVENTION

The present invention relates to a network management system for managing a managed device via, for example, a network, and more particularly to a management object process unit incorporated in the managed device as an agent, and a machine readable recording medium having a management object process program recorded thereon.

In the network management system, generally, a host device is connected to a managed device, such as, for example, a printer, a facsimile, or a computer via a network, such as a LAN (Local Area Network). Management is performed on the basis of mainly SNMP (Simple Network Management Protocol) commands transmitted and received between a manager incorporated in the host device and the agent incorporated in the managed device. The agent receives a request transmitted in the form of the SNMP command from the manager and transmits a response for the request in the form of the SNMP command to the manager. In the transmission and reception of the SNMP commands, a communication protocol such as a TCP/IP is utilized.

The SNMP command from the manager requests a management object such as structure information, status information, or the like. The agent collects the management object for this request from the managed device to transmit the response containing this management object. However, when the agent or the managed device is busy, there is a case in which a long elapse of time is required before transmission of the response for the request, or no response is transmitted due to the property of the protocol. Thus, the manager transmits the same request again if the response is not received within a predetermined period of time. When this request is frequently repeated, the network traffic increases.

Jpn. Pat. Appln. KOKAI Publication No. 9-259062 discloses an agent capable of solving the problem described above. This agent is constituted so as to collect a plurality of management objects from the managed device in advance, store them in a memory device, and retrieve the management object requested by an SNMP manager from this memory device so that effective collection time for the management object is reduced to attain a quick response.

With the agent of the publication, all management objects are unconditionally collected in advance and stored in the memory device. This structure permits that the total collection time becomes longer according to an increase in the number of management objects. If collection of all the management objects cannot be completed while the managed device is not busy, some of the management objects are not stored in the memory device before the manager requests collection thereof. This causes a problem that the management objects are not effectively collected for the load of the agent. Further, the process for collecting the management objects in advance is independently executed of the process for transmitting a response for the request issued from the SNMP manager. This causes another problem that a complicated structure is required for the agent.

BRIEF SUMMARY OF THE INVENTION

It is an object of the present invention to provide a management object process unit and a machine readable recording medium having a management object process program recorded thereon, each of which can prevent an increase of a load by optimizing the number of management objects requiring quick response to a collection request.

According to the present invention, there is provided a management object process unit which comprises a control processing section for performing a control of selectively collecting a plurality of management objects from a managed device, and a memory section for storing the management objects collected from the managed device, wherein the control processing section includes an object managing section, having items of classification data for classifying the plurality of management objects respectively, for collecting those of the management objects in advance which are classified to a specific type by the classification data to store the collected management objects in the memory section, for checking, at a time of receiving an object collection request, the classification data for a management object requested by the object collection request, for retrieving the management object confirmed by a check result as being of the specific type from the memory section to transmit the retrieved management object, and for collecting the management object confirmed by the check result as being of a type other than the specific type from the managed device to transmit the collected management object.

According to the present invention, there is also provided a machine readable recording medium having a program of a management object process recorded thereon, which process comprises steps of: collecting those of the management objects in advance which are classified to a specific type by items of classification data to store the collected management objects in a memory section; checking, at a time of receiving an object collection request, the classification data for a management object requested by the object collection request; retrieving the management object confirmed by a check result as being of the specific type from the memory section to transmit the retrieved management object; and collecting the management object confirmed by the check result as being of a type other than the specific type from the managed device to transmit the collected management object.

With the management object process unit and the machine readable recording medium having a management object process program, only the management objects of a specific type can be collected in advance from the managed device and stored in the memory section. Therefore, the total collection time is shortened as compared with the case where the management objects of a type other than the specific type are collected in advance in addition to the management objects of the specific type. Accordingly, collection of the management objects to be stored in advance in the memory section can be easily completed within the time period during which the managed device is not busy. In addition, in a case where collection of the management object of the specific type is requested and this management object is stored in the memory section, this management object is retrieved from the memory section and transmitted as a response. Accordingly, the network traffic can be prevented from increasing due to repetition of the collection request for this management object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing the structure of a management table shown in FIG. 4;

FIG. 6 is a diagram for explaining classification data shown in FIG. 5;

FIG. 7 is a diagram showing response processing rules for classified types set in the processing rule record section shown in FIG. 4;

FIG. 9 is a diagram showing a first modification of the management table shown in FIG. 5;

FIG. 10 is a diagram showing a second modification of the management table shown in FIG. 5;

FIG. 11 is a diagram showing response processing rules set in a processing rule record section incorporated into a SNMP agent in a network management system according to a second embodiment of the present invention;

FIG. 13 is a diagram showing the structure of a management table incorporated into an SNMP agent in a network management system according to a third embodiment of the present invention;

FIG. 14 is a diagram for explaining the classification data shown in FIG. 13;

FIG. 15 is a diagram showing response processing rules set in a processing rule record section in the network management system according to the third embodiment;

FIG. 17 is a diagram showing a modification of the management table shown in FIG. 13;

FIG. 18 is a diagram for explaining classification data shown in FIG. 17; and

FIG. 19 is a block diagram showing a modification that the SNMP agent shown in FIG. 1 is formed of a network card having an agent program.

DETAILED DESCRIPTION OF THE INVENTION

A network management system according to the first embodiment of the present invention will be described with reference to FIGS. 1 to 8.

Figure 1:
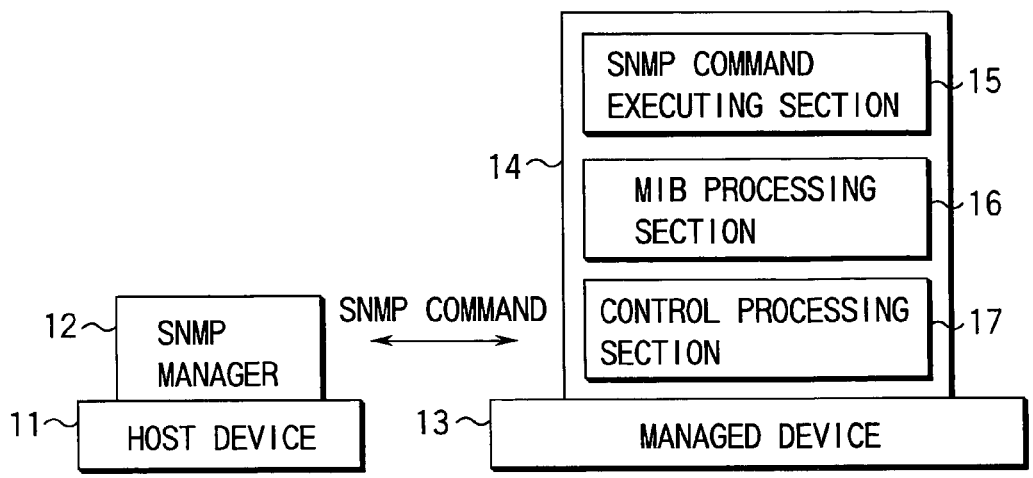
FIG. 1 is a block diagram showing the arrangement of a network management system according to a first embodiment of the present invention.

FIG. 1 shows the arrangement of the network management system. In the network management system, a host device 11 such as a computer is connected to a managed device 13 such as a printer, a facsimile, another computer or the like, via a network such as a LAN. Management is performed on the basis of SNMP (Simple Network Management Protocol) commands transmitted and received between an SNMP manager 12 incorporated in the host device 11 and an SNMP agent 14 incorporated in the managed device 13. The SNMP manager 12 is constituted by a hardware resource of the host device 11, which includes a CPU, a memory and a communication interface and is controlled by means of a manager program. The SNMP agent 14 is constituted by a hardware resource of the managed device 13, which includes a CPU, a memory and a communication interface and is controlled by means of an agent program. The SNMP agent 14 receives a request transmitted from the SNMP manager 12 in the form of the SNMP command and transmits a response for the request to the SNMP manager 12 in the form of the SNMP command. In the transmission and reception of the SNMP commands, a communication protocol such as a TCP/IP is utilized.

Figure 2:
FIG. 2 is a diagram showing the structure of a SNMP command transmitted and received between an SNMP manager and an SNMP agent shown in FIG. 1.

FIG. 2 shows a field format of the SNMP command. That is, the field of the SNMP command is constituted so as to include a commend type, a request index, and a management object identifier. The command type specifies one of commands such as GET, GETNEXT, SET, TRAP, and the like. The request identifier specifies whether it is a command request or a command response. The management object identifier specifies a device address and a management object referred to by the command. Here, the GET is a command for requesting collection of a management object, the GETNEXT is a command for requesting collection of the next management object, the SET is a command for requesting setting of a management object, and the TRAP is a command for requesting confirmation of a management object collected when the managed device 13 becomes in a predetermined state.

As shown in FIG. 1, the SNMP agent 14 includes an SNMP command executing section 15, an MIB (Management Information Base) processing section 16, and a control processing section 17. The SNMP command executing section 15 executes SNMP commands other than those of an object collection request. The MIB processing section 16 collects a management object specified by the SNMP command of the object collection request from the managed device 13 and processes the management object into an MIB format. The control processing section 16 performs a control process of controlling the SNMP command executing section 15 and the MIB processing section 16 based on the SNMP command.

Figure 3:
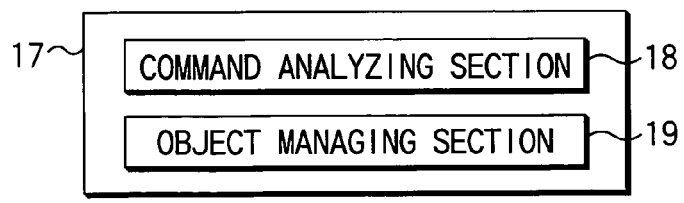
FIG. 3 is a block diagram showing the structure of a control processing section shown in FIG. 1.

As shown in FIG. 3, the control processing section 17 includes a command analyzing section 18 and an object managing section 19. The command analyzing section 18 analyzes the SNMP command received from the SNMP manager 12, notifies the object managing section 19 of the management object identifier when the SNMP command is the type in which collection of the management object is requested, such as the GET command or the GETNEXT command, and sends the SNMP command to the SNMP command executing section 15 when the SNMP command is the type in which collection of the management object is not requested, such as the SET command and the TRAP command. The object managing section 19 manages the management object collected in the MIB processing section 16.

Figure 4:
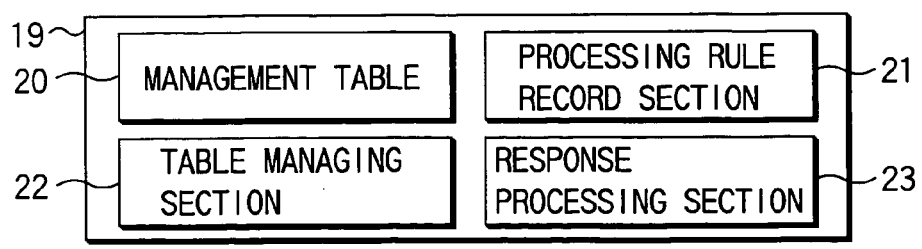
FIG. 4 is a block diagram showing the structure of an object managing section shown in FIG. 2.

As shown in FIG. 4, the object managing section 19 includes a management table 20, a processing rule record section 21, a table managing section 22, and a response processing section 23. The management table 20 and the processing rule record section 21 are held in a memory of the managed device 13.

The management table 20 is composed of plural sets of table information each including the management object identifier, a collected management object, attribute data, and a classification data. The attribute data and the classification data are stored as management information for a management object, which is identified by the management object identifier. The attribute data represents, for example, a collection time, an access frequency, a value change frequency, and the like indicating an attribute of a management object. The processing rule record section 21 has records of response processing rules for responding to collection requests of management objects according to the classified types thereof. The table managing section 22 has a structure of performing a table managing process having a process of determining classification data for management objects based on attribute data for the management objects respectively and a process of reading classification data stored in the management table 20 for a management object corresponding to the management object identifier supplied from the command analyzing section 18 and supplying the classification data to the response processing section 23. The response processing section 23 has a structure of collecting the management object according to a response processing rule recorded in the processing rule record section 21 for the type classified by the classification data from the table managing section 22 and transmitting a response containing the management object to the SNMP manager 12. That is, if the control processing section 17 receives a SNMP command such as the GET or GETNEXT command, the command analyzing section 18 first identifies that it is the SNMP command of the type requesting collection of a management object based on the command type and takes out the management object identifier of this SNMP command. Then, the table managing section 22 refers to the management table 20 to determine the type classified by the classification data for the management object identified based on the management object identifier taken out by the command analyzing section 18. Next, the response processing section 23 refers to the processing rule record section 21 to determine the response processing rule corresponding to this classified type determined by the table managing section 22 and performs a processing for responding to the collection request for the management object according to the response processing rule. Finally, the table managing section 22 updates the management table 20 based on a result of the response processing.

Here, the management table 20, the processing rule record section 21, the table managing section 22, and the response processing section 23 will be explained in detail.

The management table 20 has a structure shown in FIG. 5, for example. In FIG. 5, each set of table information is composed of the management object identifier, the management object collection time, the collected management object, and classification data. The management object identifier is stored in a memory area 20a in the form of specifying a device address and a management object similarly to the management object identifier of the SNMP command. The management object collection time is stored in a memory area 20b and corresponds to the time needed for the MIB processing section 16 to collect the management object. Since the MIB processing section 16 collects various management objects, such as a management object previously held in the managed device 13, a management object that is a result of calculation performed in the managed device 13, or a management object that is a result of processes combined in the managed device 13, the collection times of these management objects are generally different from each other. Accordingly, each collection time is set in advance by actually measuring the time needed to collect corresponding management object and estimating by calculation. The management object is stored in a memory area 20c and corresponds to that collected from the managed device 13 by the MIB processing section 13. The classification data is stored in a memory area 20d and corresponds to a result of comparison in which the collection time of the management object is compared with a reference value substantially equal to an average of the collection times obtained for different management objects, by the table managing section 22. As shown in FIG. 6, the management object is classified to a type A when the collection time is longer than the reference value thereof and is classified to a type B when the collection time is not longer than the reference value thereof.

The processing rule record section 21 has records shown in FIG. 7, for example. The record of the type A represents the response processing rule, "Send a collection request for the management object of the received identifier to the MIB processing section 16". The record of the type B represents the response processing rule, "Send a collection request to the MIB processing section 16 to previously store collected management objects in the management table. Read the management object of the received identifier from the management table 20 to produce a response".

Figure 8:
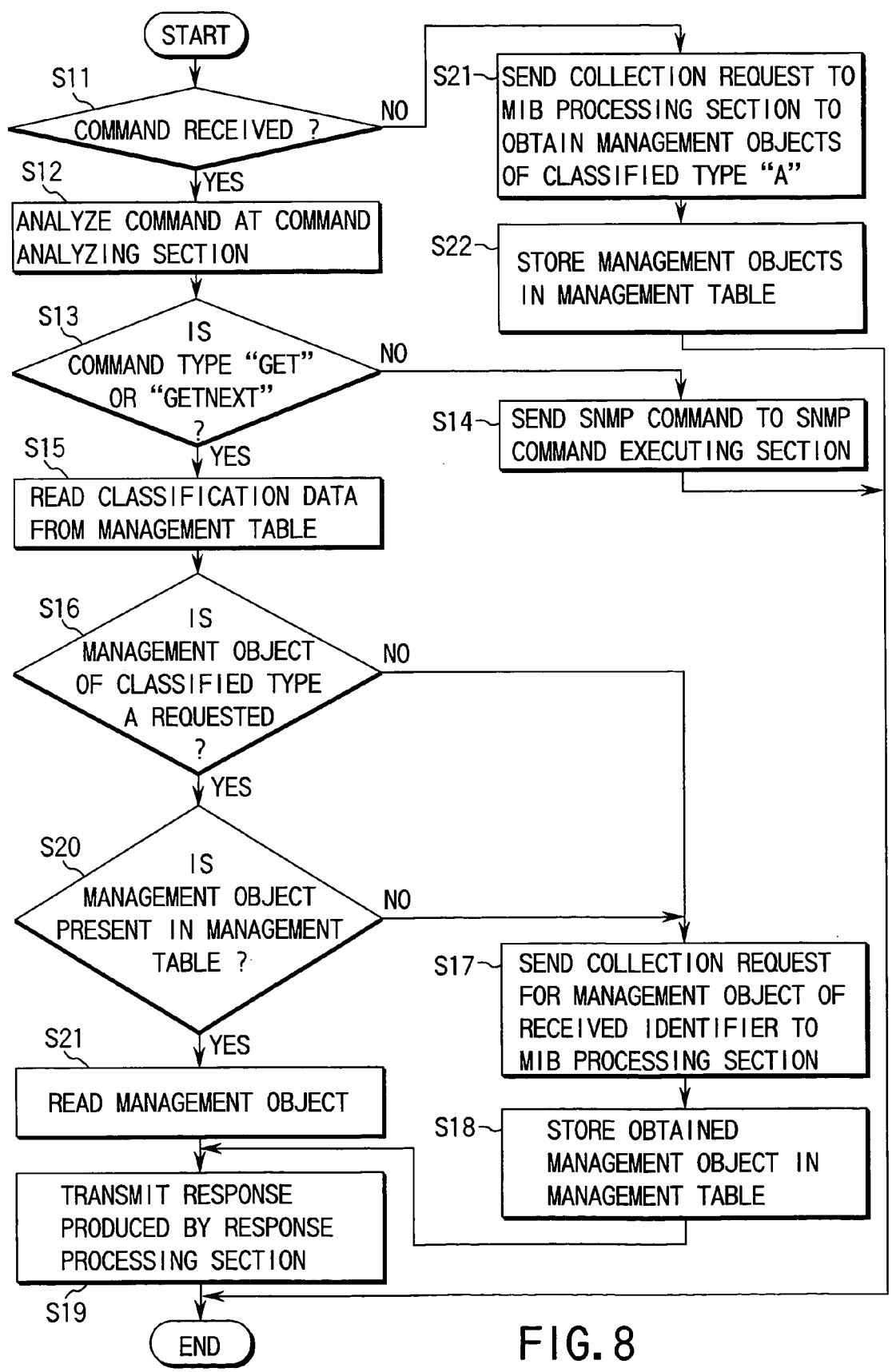
FIG. 8 is a flowchart showing in detail a management object process performed by a control of the control processing section shown in FIG. 1.

FIG. 8 shows a management object process performed by a control of the control processing section 17. When this management object process is started, the control processing section 17 first checks in step S11 whether or not an SNMP command from the SNMP manager 12 is received. When the SNMP command has been received, the command analyzing section 18 analyzes the SNMP command in step S12. That is, a command type is read out from the SNMP command. Based on this command type it is checked in step S13 whether the SNMP command is the GET or GETNEXT command. When it is detected that the SNMP command is not the GET or GETNEXT command, this SNMP command is supplied to the SNMP command executing section 15 in step S14. After this, the management object process is finished.

On the other hand, when it is detected in step S13 that the SNMP command is the GET or the GETNEXT command, the table managing section 22 reads the classification data stored in the management table 20 for the management object corresponding to the identifier supplied from the command analyzing section 18 and supplies it to the response processing section 23 in step S15.

In the response processing section 23, it is checked in step S16 whether or not the management object of the classified type A has been requested. When it is not the management object of the classified type A, the response processing section 23 reads the response processing rule corresponding to the classified type B from the processing rule record section 21 and performs a processing for responding to the collection request according to the response processing rule.

That is, a collection request for the management object of the received identifier is sent to the MIB processing section 16 in step S17. The MIB processing section 16 collects this management object from the managed device 13 in step S18 and stores it in the management table 20. Next, in step S19 the response processing section 23 sends a response command containing the management object held in the management table 20 to the SNMP manager 12. Then, the management object process is finished.

When it is detected in step S16 that the management object of the classified type A has been requested, the table managing section 22 searches the management table 20 for the management object of the received identifier in step S20 to check whether or not this management object has already been collected and stored in the management table 20. When the management object is not stored in the management table 20, the processes of steps S16, S17, S18 are performed one after another similarly to the case of the classified type B, and the management object process is finished. On the other hand, when the management object has been stored in the management table 20, the response processing section 23 reads this management object from the management table 20 in step S21 and sends a response command containing the management object to the SNMP manager 12 in step S19. Then, the management object process is finished.

When it is detected in step S11 that no SNMP command has been received, the table managing section 22 sends a collection request for the management objects of the classified type A to the MIB processing section 16 in step S21. The MIB processing section 16 collects the management objects of the classified type A from the managed device 13, for example, utilizing the time period during which the managed device 13 is not busy and stores respective management objects in the management table 20 in step S22.

As described above, since the SNMP agent 14 has a structure of collecting in advance only the management objects of the type A requiring a long collection time from the managed device 13 by the MIB processing section 16 and holding the management objects in the management table 20, the total collection time is shortened as compared with the case where the management objects of the type B are collected in advance in addition to the management objects of the type A. Thus, collection of the management objects to be stored in advance in the management table 20 can be easily completed within the time period during which the managed device 13 is not busy.

In addition, in a case where collection of the management object of the classified type A requiring a long collection time is requested and this management object has been stored in the management table 20, this management object is retrieved from the management table 20 and quickly transmitted as a response. Since the SNMP manager 12 does not need to repeat the collection request for the management object, the network traffic can be prevented from increasing.

In the present embodiment, although a case where a plurality of management objects are classified based on the collection time thereof is described, the present embodiment is not limited to this case and can be modified variously.

FIG. 9 shows a first modification of the management table 20 shown in FIG. 5. In the management table 20 of this first modification, a memory area 20e is provided to classify the management object based on the value change frequency, instead of the memory area 20b storing the management object collection time shown in FIG. 5. More specifically, sequentially collected n management object values are stored in the memory area 20e as history data values (1) to (n). This area 20e has a ring buffer structure in which the oldest history data value is discarded to store the newest history data value.

The table managing section 22 seeks the number of value changes in the management object during a predetermined time period from the history data values (1) to (n) and compares the number of value changes with a reference value substantially equal to an average of the numbers of value changes obtained for different management objects. The management object is classified to the type A requiring a high frequency value change when the number of value changes is greater than the reference value thereof, and is classified to the type B requiring a low frequency value change when the number of value changes is not greater than the reference value thereof.

Each history data value is stored when the management object is stored in the management table 20 in step S18 and S22 shown in FIG. 8, and at each time, the classification data for the management object is determined based on the frequency of the management object value changes and is stored in the memory area 20d of the management table 20. That is, the management object is determined that the more frequent the value changes are, the higher the necessity for monitoring is and is transmitted to the manager 12 as a response command without requiring a considerable time delay.

As described above, since the SNMP agent 14 has a structure of collecting in advance only the management objects of the type A requiring a high frequency value change from the managed device 13 by the MIB processing section 16 and holding the management objects in the management table 20, the total collection time is shortened as compared with the case where the management objects of the type B are collected in advance in addition to the management objects of the type A. Thus, collection of the management objects to be stored in advance in the management table 20 can be easily completed within the time period during which the managed device 13 is not busy.

In addition, in a case where collection of the management object of the classified type A requiring a high frequency value change is requested and this management object has been stored in the management table 20, this management object is retrieved from the management table 20 and quickly transmitted as a response. Since the SNMP manager 12 does not need to repeat the collection request for the management object, the network traffic can be prevented from increasing.

FIG. 10 shows the second modification of the management table 20. In the management table 20 of this second modification, a memory area 20f is provided to classify the management object based on the access frequency instead of the memory area 20b storing the management object collection time shown in FIG. 5. More specifically, the number of accesses from the SNMP manager 12 is counted for each predetermined period of time and is sequentially stored in the memory area 20f as the numbers of accesses within n time bands (1) to (n). The number of accesses is increased by "1" each time the collection of the management object is requested. This memory area 20f has a ring buffer structure in which the number of accesses of the oldest time band is discarded to store the number of accesses of the newest time band for each predetermined period time.

The table managing section 22 compares the number of accesses with a reference value substantially equal to an average of the numbers of accesses obtained for different management objects. The management object is classified to the type A requiring a high frequency access when the number of accesses is greater than the reference value thereof, and is classified to the type B requiring a low frequency access when the number of accesses is not greater than the reference value thereof.

The number of accesses is stored in the memory area 20*f* of the management table 20 when the management object is stored in step S18 shown in FIG. 8, and at each time, the classification data is determined based on the access frequency and is stored in the memory area 20*d* of the management table 20.

As described above, since the SNMP agent 14 has a structure of collecting in advance only the management objects of the type A requiring a high frequency access from the managed device 13 by the MIB processing section 16 and holding the management objects in the management table 20, the total collection time is shortened as compared with the case where the management objects of the type B are collected in advance in addition to the management objects of the type A. Thus, collection of the management objects to be stored in advance in the management table 20 can be easily completed within the time period during which the managed device 13 is not busy.

In addition, in a case where collection of the management object of the classified type A requiring a high frequency access is requested and this management object has been stored in the management table 20, this management object is retrieved from the management table 20 and quickly transmitted as a response. Since the SNMP manager 12 does not need to repeat the collection request for the management object, the network traffic can be prevented from increasing.

The network management system according to the second embodiment of the present invention will be described with reference to FIGS. 11 and 12.

This network management system is constituted similarly to the first embodiment except the following constitution. Therefore, similar parts will be expressed by the same reference numerals and the explanation thereof will be simplified or omitted.

In the second embodiment, the processing rule record section 21 has records shown in FIG. 11. The record of the type A represents the response processing rule, "Send a collection request for management objects of type B to the MIB processing section 16 to store the collected management objects in the management table 20. Thereafter, send a collection request for the management object of the received identifier to the MIB processing section 16". The record of the type B represents the response processing rule, "Read the management object of the received identifier from the management table 20. If it is absent, send a collection request for the management object of the received identifier to the MIB processing section 16".

Figure 12:
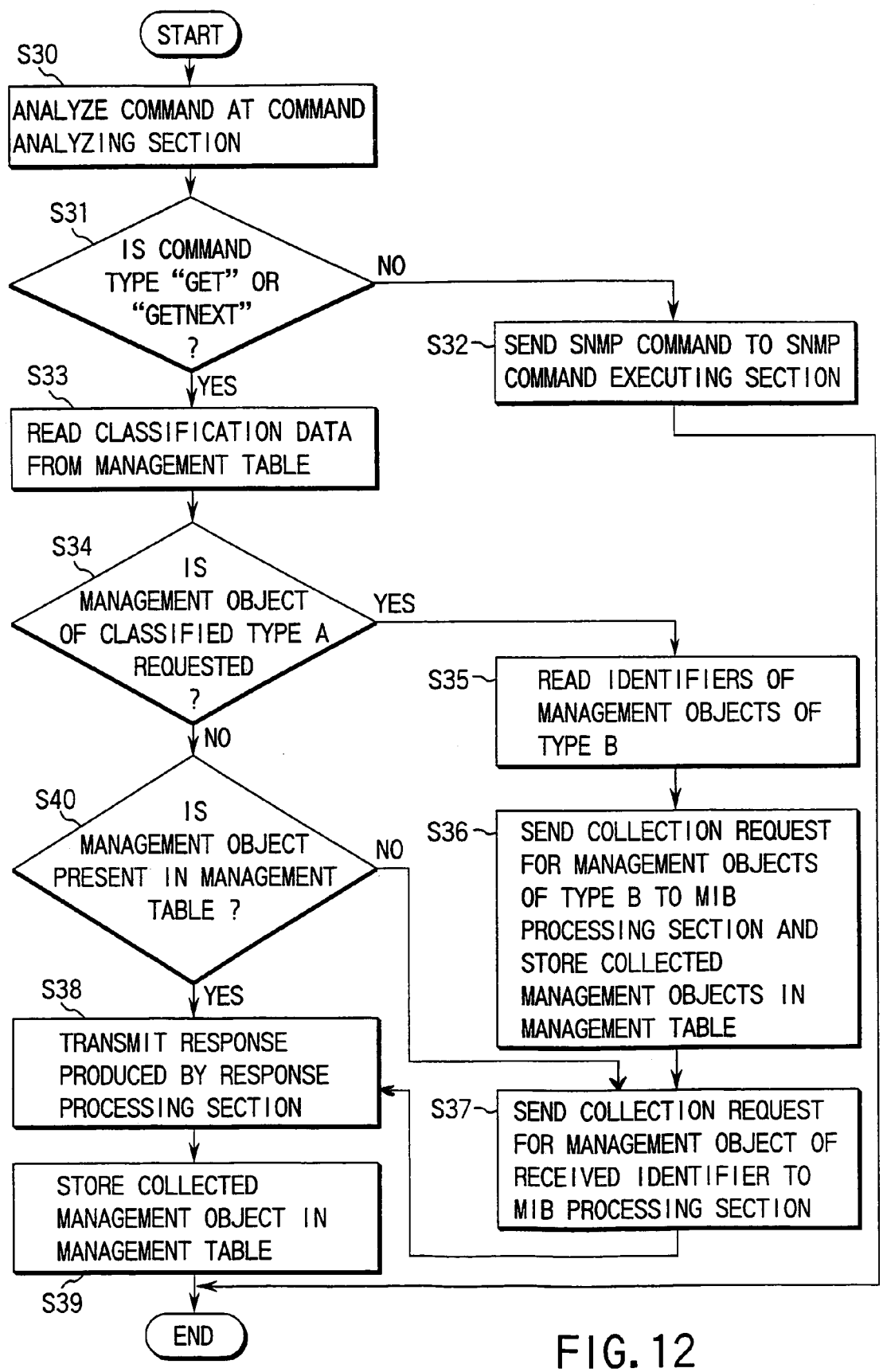
FIG. 12 is a flowchart showing in detail a management object process performed by a control of a control processing section in the network management system according to the second embodiment.

As shown in FIG. 12, the management object process is performed by a control of the control processing section 17. When this management object process is started, the command analyzing section 18 analyzes the SNMP command in step S30. That is, a command type is read out from the SNMP command. Based on this command type it is checked in step S31 whether the SNMP command is the GET or GETNEXT command. When it is detected that the SNMP command is not the GET or GETNEXT command, this SNMP command is supplied to the SNMP command executing section 15 in step S32. After this, the management object process is finished.

On the other hand, when it is detected in step S31 that the SNMP command is the GET or the GETNEXT command, the table managing section 22 reads in step S33 the classification data stored in the management table 20 for the management object corresponding to the identifier supplied from the command analyzing section 18 and supplies it to the response processing section 23.

In the response processing section 23, it is checked in step S34 whether or not the management object of the classified type A has been requested. When it is the management object of the classified type A, the response processing section 23 reads the response processing rule corresponding to the classified type B from the processing rule record section 21 and performs a processing for responding to the collection request according to the response processing rule. That is, the identifiers of the management objects of the classified type B are read from the management table 20 in step S35, and a collection request for the management objects of the classified type B is sent to the MIB processing section 16 in step S36 so as to store the management objects collected herein in the management table 20. Then, in step S37, a collection request for the management object of the received identifier is sent to the MIB processing section 16. When the MIB processing section 16 collects this management object from the managed device 13, the response processing section 23 sends a response command containing the management object to the SNMP manager 12 in step S38 and stores the management object in the management table 20. Then, the management object process is finished.

When it is detected in step S34 that the management object of the classified type B has been requested, the table managing section 22 searches the management table 20 for the management object of the received identifier in step S40 to check whether or not this management object has already been collected and stored in the management table 20. When the management object is not stored in the management table 20, the processes of steps S37, S38, S39 are performed one by one similarly to the case of the classified type A, and the management object process is finished. On the other hand, when the management object has been stored in the management table 20, the response processing section 23 reads this management object from the management table 20 in step S38 and sends a response command containing the management object to the SNMP manager 12. In the following step S39, since the management object has already been stored in the management table 20, nothing is taken place, and the management object process is finished.

As described above, since the SNMP agent 14 has a structure of collecting in advance only the management objects of the type B requiring a short collection time from the managed device 13 by the MIB processing section 16 and holding the management objects in the management table 20, the total collection time is shortened as compared with the case where the management objects of the type A are collected in advance in addition to the management objects of the type B. Thus, collection of the management objects to be stored in advance in the management table 20 can be easily completed within the time period during which the managed device 13 is not busy.

In addition, in a case where collection of the management object of the classified type B requiring a short collection time is requested and this management object has been stored in the management table 20, this management object is retrieved from the management table 20 and quickly transmitted as a response. Since the SNMP manager 12 does not need to repeat the collection request for the management object, the network traffic can be prevented from increasing.

Further, when the collection of the management object of the classified type A requiring a long collection time is requested, since the management objects of the classified type B requiring a short collection time is collected prior to the collection of the management object of the classified type A, it is not necessary to independently perform as in the prior art the process for storing the management objects in the management table 20 in advance. Incidentally, since the collection time of each management object of the classified type B is short, the management object of the classified type A can be collected without requiring a considerable time delay.

The network management system according to the third embodiment of the present invention will be described with reference to FIGS. 13 to 16.

This network management system is constituted similarly to the first embodiment except the following constitution. Therefore, similar parts will be expressed by the same reference numerals and the explanation thereof will be simplified or omitted.

The management table 20 of this embodiment has a structure shown in FIG. 13. In this management table 20, a memory area 20f is added to the management table 20 shown in FIG. 5 so as to classify the management object based on the access frequency. More specifically, the number of accesses from the SNMP manager 12 is counted for each predetermined period of time and is sequentially stored in the memory area 20f as the numbers of accesses within n time bands (1) to (n). The number of accesses is increased by "1" each time the collection of the management object is requested. This memory area 20f has a ring buffer structure in which the number of accesses of the oldest time band is discarded to store the number of accesses of the newest time band for each predetermined period of time.

The table managing section 22 compares the collection time and the number of accesses with a reference value substantially equal to an average of the collection times obtained for different management objects and a reference value substantially equal to an average of the numbers of accesses obtained for the different management objects, respectively. As shown in FIG. 14, the management object is classified to the type A requiring a long collection time when the collection time is greater than the reverence value thereof, is classified to the type B requiring a short collection time and a high access frequency when the collection time is not greater than the reference value thereof and the number of accesses is greater than the reference value thereof, and is classified to the type C requiring a short collection time and a low access frequency when the collection time is not greater than the reference value thereof and the number of accesses is not greater than the reference value thereof.

In the third embodiment, the processing rule record section 21 has records shown in FIG. 15. That is, the record of the type A represents the response processing rule, "Send a collection request for management objects of the type B and store the obtained management objects in the management table 20. Thereafter, send a collection request for the management object of the received identifier to the MIB processing section 16". The record of the type B represents the response processing rule, "Read the management object of the received identifier from the management table 20. If it is absent, send a collection request for the management object of the received identifier to the MIB processing section 16". The record of the type C represents the response processing rule, "Send a collection request for the management object of the received identifier to the MIB processing section 16".

Figure 16A:
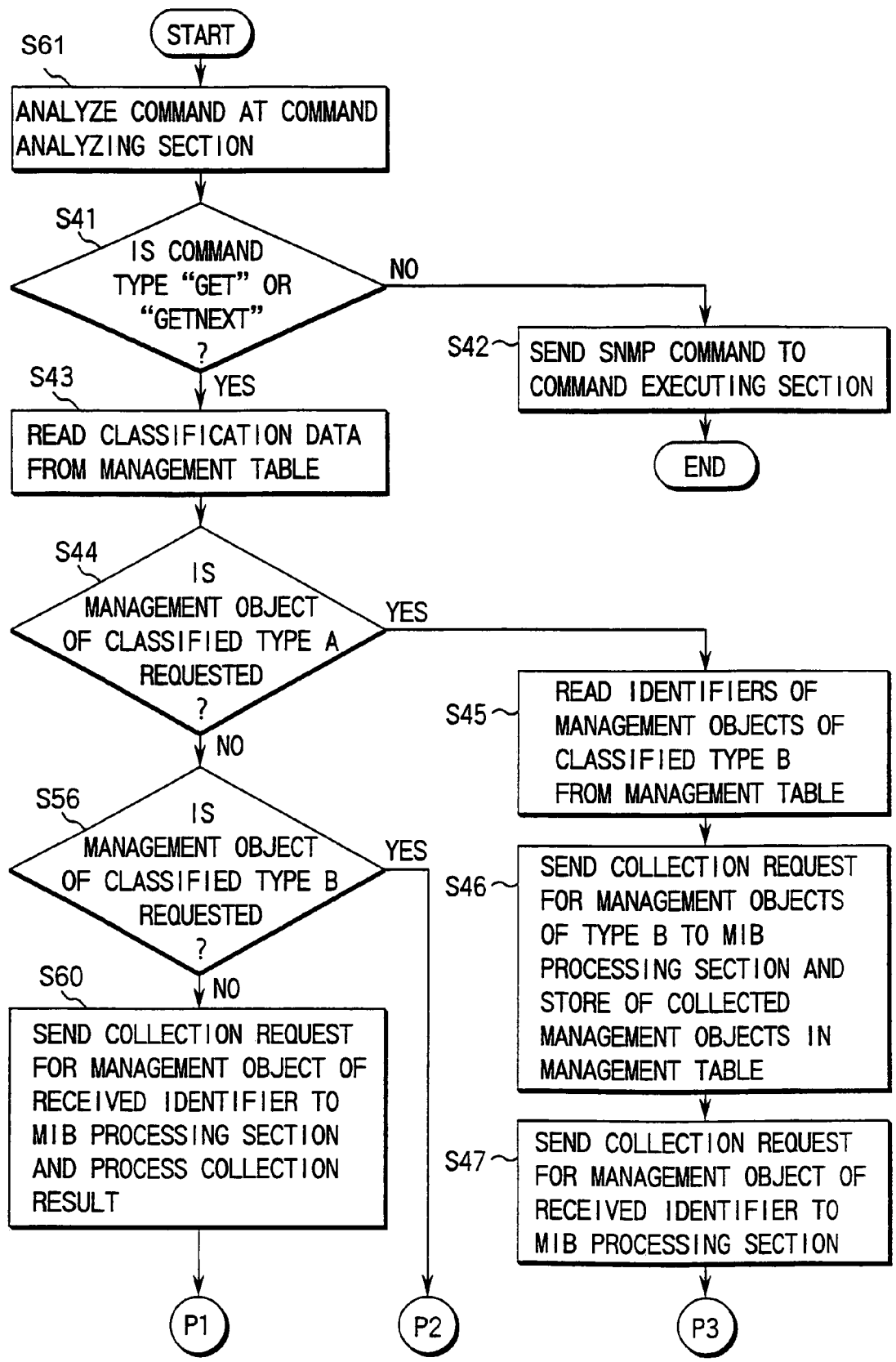
FIGS. 16A and 16B are a flowchart showing in detail a management object process performed by a control of a control processing section in the network management system according to the third embodiment.
Figure 16B:
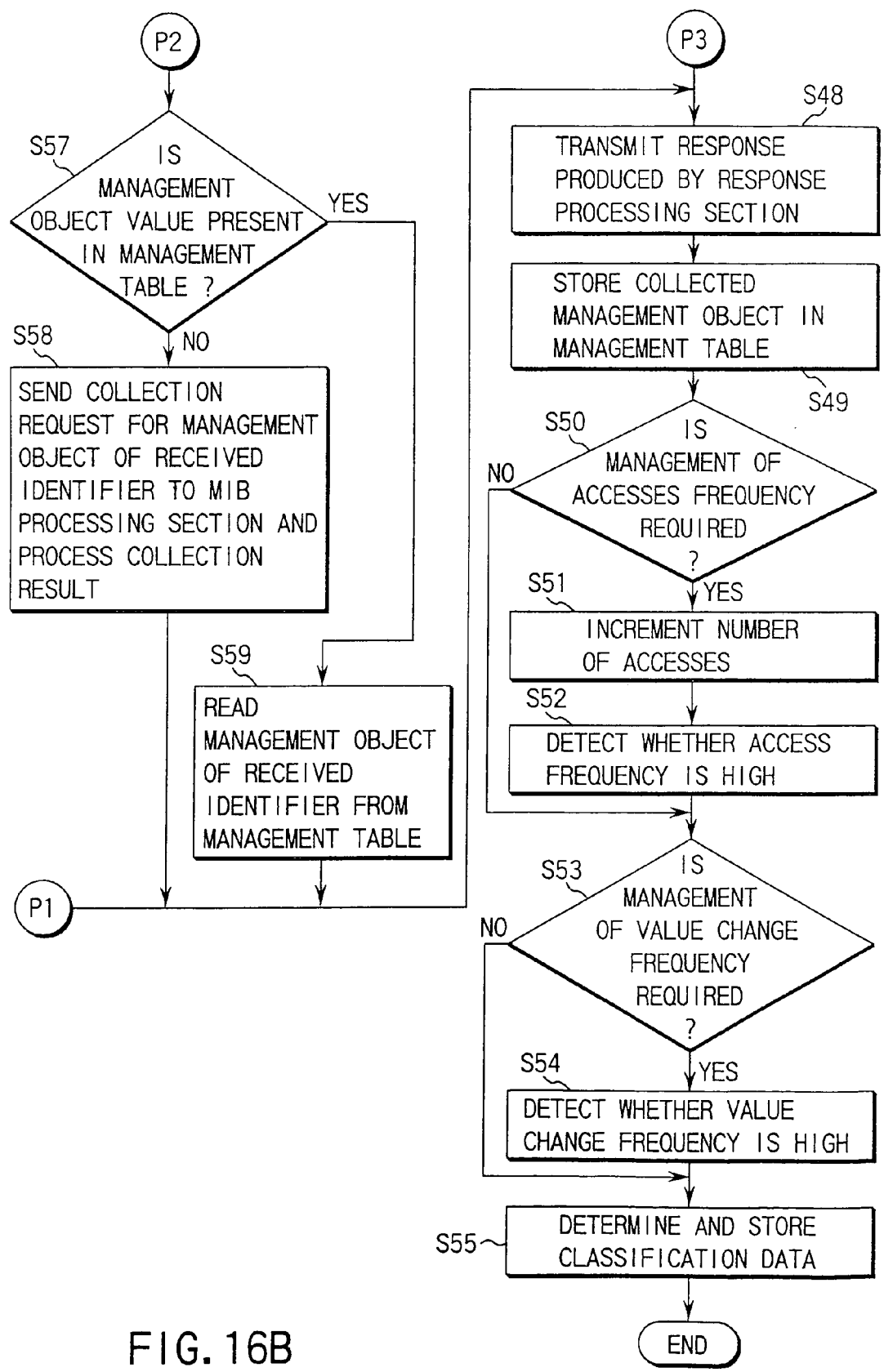

As shown in FIGS. 16A and 16B, the management object process is performed by a control of the control processing section 17. When this management object process is started, the command analyzing section 18 analyzes the SNMP command in step S61. That is, a command type is read out from the SNMP command. Based on this command type it is checked in step S41 whether the SNMP command is the GET or GETNEXT command. When it is detected that the SNMP command is not the GET or GETNEXT command, this SNMP command is supplied to the SNMP command executing section 15 in step S42. After this the management object process is finished.

On the other hand, when it is detected in step S41 that the SNMP command is the GET or the GETNEXT command, the table managing section 22 reads in step S43 the classification data stored in the management table 20 for the management object corresponding to the identifier supplied from the command analyzing section 18 and supplies it to the response processing section 23.

In the response processing section 23, it is checked in step S44 whether or not the management object of the classified type A has been requested. When it is the management object of the classified type A, the response processing section 23 reads the response processing rule corresponding to the classified type B from the processing rule record section 21 and performs a processing for responding to the collection request according to the response processing rule. That is, the identifiers of the management objects of the classified type B are read from the management table 20 in step S45, and a collection request for the management objects of the classified type B is sent to the MIB processing section 16 in step S46 to store the management objects collected herein in the management table 20. Then, a collection request for the management object of the received identifier is sent in step S47 to the MIB processing section 16. When the MIB processing section 16 collects this management object from the managed device 13, the response processing section 23 transmits in step S48 a response command containing the management object to the SNMP manager 12 and store the management object in the management table 20. Then, it is checked in step S50 whether or not management of the access frequency is required. Since the access frequency is managed in this embodiment, the number of accesses is increased by "1" in the management table 20 in step S51, and further the number of accesses is compared in step S52 with the reference value thereof to detect whether the access frequency is high. Next, it is checked in step S53 whether or not management of the value change frequency is required. In this embodiment, although the value change frequency is not managed, in the case where the value change frequency is managed, the number of value changes is compared in step S54 with the reference value thereof to detect whether the value change frequency is high. After step S54, or in the case where it is detected in step S53 that management of the value change frequency is not required, the classification data is determined in step S55 based on results obtained in steps S52 and S54, and this classification data is stored in the management table 20. After this, the management object process is finished.

When it is detected in step S44 that the management object of the classified type A has not been requested, it is further checked in step S56 whether the management object of the classified type B has been requested. If it is the management object of the classified type B, the table managing section 22 searches the management table 20 for the management object of the received identifier in step S57 to determine whether or not this management object has already been collected and held in the management table 20. When the management object is not present in the management table 20, a collection request for the management object of the received identifier is sent to the MIB processing section 16 in step S58. Then, step S48 is executed to transmit a response command containing the management object obtained by the MIB processing section 16 to the SNMP manager 12. On the other hand, when the management object is present in the management table 20, the response processing section 23 reads the management object from the management table 20 in step S59, and step S48 is executed to transmit a response command containing the management object to the SNMP manager 12.

When it is not the management object of the classified type B in step S56, a collection request for the management object of the received identifier is sent to the MIB processing section 16 in step S60. Then, step S48 is executed to transmit a response command containing the management object obtained by the MIB processing section 16 to the SNMP manager 12.

As described above, since the SNMP agent 14 has a structure of collecting in advance only the management objects of the type B requiring a short collection time and a high access frequency from the managed device 13 by the MIB processing section 16 and holding the management objects in the management table 20, the total collection time is shortened as compared with the case where the management objects of the types A and C are collected in advance in addition to the management objects of the type B. Thus, collection of the management objects to be stored in advance in the management table 20 can be easily completed within the time period during which the managed device 13 is not busy.

In addition, in a case where collection of the management object of the classified type B is requested and this management object has been stored in the management table 20, this management object is retrieved from the management table 20 and quickly transmitted as a response. Since the SNMP manager 12 does not need to repeat the collection request for the management object, the network traffic can be prevented from increasing.

Further, when the collection of the management object of the classified type A requiring a long collection time is requested, since the management objects of the classified type B requiring a short collection time is collected prior to the collection of the management object of the classified type A, it is not necessary to independently perform as in the prior art the process for storing the management objects in the management table 20 in advance. Incidentally, since the collection time of each management object of the classified type B is short, the management object of the classified type A can be collected without requiring a considerable time delay.

In the third embodiment, although the case where a plurality of management objects are classified based on the collection time thereof and the access frequency thereof is described, the present embodiment is not limited to this case and can be modified variously.

FIG. 17 shows a modification of the management table 20 shown in FIG. 13. In the management table 20 of this modification, a memory area 20e is provided to classify the management object based on the collection time and the value change frequency, instead of the memory area 20f storing the access frequency shown in FIG. 13. More specifically, sequentially collected n management object values are stored in the memory area 20e as history data values (1) to (n). This area 20e has a ring buffer structure in which the oldest history data value is discarded to store the newest history data value.

The table managing section 22 compares the collection time of the management object with a reference value substantially equal to an average of the collection times obtained for different management objects, and also seeks the number of value changes in the management object during a predetermined time period from the history data values (1) to (n) and compares the number of value changes with a reference value substantially equal to an average of the numbers of value changes obtained for the different management objects. The management object is classified to the type A requiring a long collection time when the collection time is greater than the reference value thereof, is classified to the type B requiring a short collection time and a high value change frequency when the collection time is not greater than the reference value thereof and the number of value changes is greater than the reference value thereof, and is classified to the type C requiring a short collection time and a low value change frequency when the number of value changes is not greater than the reference value thereof. In this case, the processing rule record section 21 has records shown in FIG. 15.

The management object process shown in FIGS. 16A and 16B can be applied to the case where the management table 20 has a structure shown in FIG. 17. That is, it is detected in step S50 that management of the access frequency is not required, and step S53 is executed after step S50 to check whether management of the value change frequency is required. In this modification, since the value change frequency is managed, it is determined in step S54 whether or not the value change frequency is high, and the classification data of the management object is determined in step S55 to store the classification data in the management table 20.

As described above, since the SNMP agent 14 has a structure of collecting in advance only the management objects of the type B requiring a short collection time and a high value change frequency from the managed device 13 by the MIB processing section 16 and holding the management objects in the management table 20, the total collection time is shortened as compared with the case where the management objects of the types A and C are collected in advance in addition to the management objects of the type B. Thus, collection of the management objects to be stored in advance in the management table 20 can be easily completed within the time period during which the managed device 13 is not busy.

In addition, in a case where collection of the management object of the classified type B is requested and this management object has been stored in the management table 20, this management object is retrieved from the management table 20 and quickly transmitted as a response. Since the SNMP manager 12 does not need to repeat the collection request for the management object, the network traffic can be prevented from increasing.

Further, when the collection of the management object of the classified type A requiring a long collection time is requested, since the management objects of the classified type B requiring a short collection time is collected prior to the collection of the management object of the classified type A, it is not necessary to independently perform as in the prior art the process for storing the management objects in the management table 20 in advance. Incidentally, since the collection time of each management object of the classified type B is short, the management object of the classified type A can be collected without requiring a considerable time delay.

In the first to third embodiments, although the collection time of the management object is held in the management table 20, the embodiments are not limited to this configuration and can be modified variously. In a case where the control processing section 17 additionally has a function of measuring and monitoring the time for collecting each management object, the collection time of the management object may be set at the time when a result of measurement is obtained. With the constitution described above, it is possible to alter the managed device 13 incorporating the SNMP agent 14 and to flexibly deal with addition and change of the management object.

Further, in the first to third embodiments, although the SNMP agent 14 is obtained by means of an agent program which is incorporated in the memory of the managed device to control the hardware resource of the managed device 13, the embodiments are not necessarily limited to this configuration and can be modified variously.

For example, as shown in FIG. 19, a network card 141 serving as a recording medium of the agent program may be installed into the managed device 13 such as a printer, a facsimile, or a multi-function device made of the combination thereof to attain an agent having a function of the SNMP command executing section 15, the MIB processing section 16, and the control processing section 17 in the managed device 13. That is, the network card 141 can perform a management object process of receiving a collection request for a management object from the SNMP manager 12 of the host device 11, collecting the management object from the managed device 13 according to the collection request, and transmitting a response containing the management object to the SNMP manager 12. In this case, the structure of the SNMP manager 12 is not restricted depending on those of the SNMP manager 12 and the managed device 13 such as the printer, the facsimile, or the multi-function device, and the network traffic is also reduced. Furthermore, in this modification, the network card 141 serves as a recording medium of the agent program. However, this network card 141 may be replaced by another recording medium such as a disk memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A management object process unit comprising:
a control processing section for performing a control of selectively collecting a plurality of management objects from a managed device; and
a memory section for storing management objects collected from the managed device;
wherein the control processing section includes an object managing section for:
(i) classifying the management objects into a first type having a collection time that is shorter than a reference collection time, and a second type having a collection time that is not shorter than the reference collection time;
(ii) collecting the management objects of the first type, and storing the collected management objects of the first type;
(iii) performing, in response to an object collection request for a management object of the second type, a sequence of: (a) collecting the management objects of the requested second type after completion of the collection of the management objects of the first type, and (b) transmitting the collected management objects of the second type; and
(iv) performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

2. A management object process unit comprising:
a control processing section for performing a control of selectively collecting a plurality of management objects from a managed device; and
a memory section for storing management objects collected from the managed device; and
wherein the control processing section includes an object managing section for:
(i) classifying the management objects into a first type having a collection time that is shorter than a reference collection time and having an access frequency that is higher than a reference frequency, and a second type having at least one of a collection time that is not shorter than the reference collection time and an access frequency that is not higher than the reference frequency;
(ii) collecting the management objects of the first type, and storing the collected management objects of the first type;
(iii) performing, in response to an object collection request for a management object of the second type, a sequence of: (a) collecting the management objects of the requested second type after completion of the collection of the management objects of the first type, and (b) transmitting the collected management objects of the second type; and
(iv) performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

3. A management object process unit comprising:
a control processing section for performing a control of selectively collecting a plurality of management objects from a managed device; and
a memory section for storing management objects collected from the managed device;
wherein the control processing section includes an object managing section for:
(i) classifying the management objects into a first type having a collection time that is shorter than a reference collection time and having a value change frequency that is higher than a reference frequency, and a second type having at least one of a collection time that is not shorter than the reference collection time and a value change frequency that is not higher than the reference frequency;
(ii) collecting the management objects of the first type, and storing the collected management objects of the first type;
(iii) performing, in response to an object collection request for a management object of the second type, a sequence of: (a) collecting the management objects of the requested second type after completion of the collection of the management objects of the first type, and (b) transmitting the collected management objects of the second type; and (iv) performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

4. A machine readable recording medium having a program for a management object process recorded thereon, said process comprising:

classifying the management objects into a first type having a collection time that is shorter than a reference collection time, and a second type having a collection time that is not shorter than the reference collection time;

collecting the management objects of the first type, and storing the collected management objects of the first type;

performing, in response to an object collection request for a management object of the second type, a sequence of: (a) collecting the management objects of the requested second type after completion of the collection of the management objects of the first type, and (b) transmitting the collected management objects of the second type; and performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

5. A machine readable recording medium having a program for a management object process recorded thereon, said process comprising:

classifying the management objects into a first type having a collection time that is shorter than a reference collection time and having an access frequency that is higher than a reference frequency, and a second type having at least one of a collection time that is not shorter than the reference collection time and an access frequency that is not higher than the reference frequency;

collecting the management objects of the first type, and storing the collected management objects of the first type;

performing, in response to an object collection request for a management object of the second type, a sequence of: (a) collecting the management objects of the requested second type after completion of the collection of the management objects of the first type, and (b) transmitting the collected management objects of the second type; and performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

6. A machine readable recording medium having a program for a management object process recorded thereon, said process comprising:

classifying the management objects into a first type having a collection time that is shorter than a reference collection time and having a value change frequency that is higher than a reference frequency, and a second type having at least one of a collection time that is not shorter than the reference collection time and a value change frequency that is not higher than the reference frequency;

collecting the management objects of the first type and storing the collected management objects of the first type;

performing, in response to an object collection request for a management object of the second type, a sequence of; (a) collecting the management objects of the requested second type after completion of the collection of the management objects of the first type, and (b) transmitting the collected management objects of the second type; and performing, in response to an object collection request for a management object of the first type, a sequence of: (a) retrieving from the memory section the management objects of the requested first type, and (b) transmitting the retrieved management objects of the first type, such that the management objects of the first type can be transmitted concurrently with the collection of the management objects of the second type.

* * * * *